Nov. 27, 1945.  L. W. HELMUTH  2,389,907
VEHICLE STRUCTURE
Filed Dec. 9, 1941  3 Sheets-Sheet 1
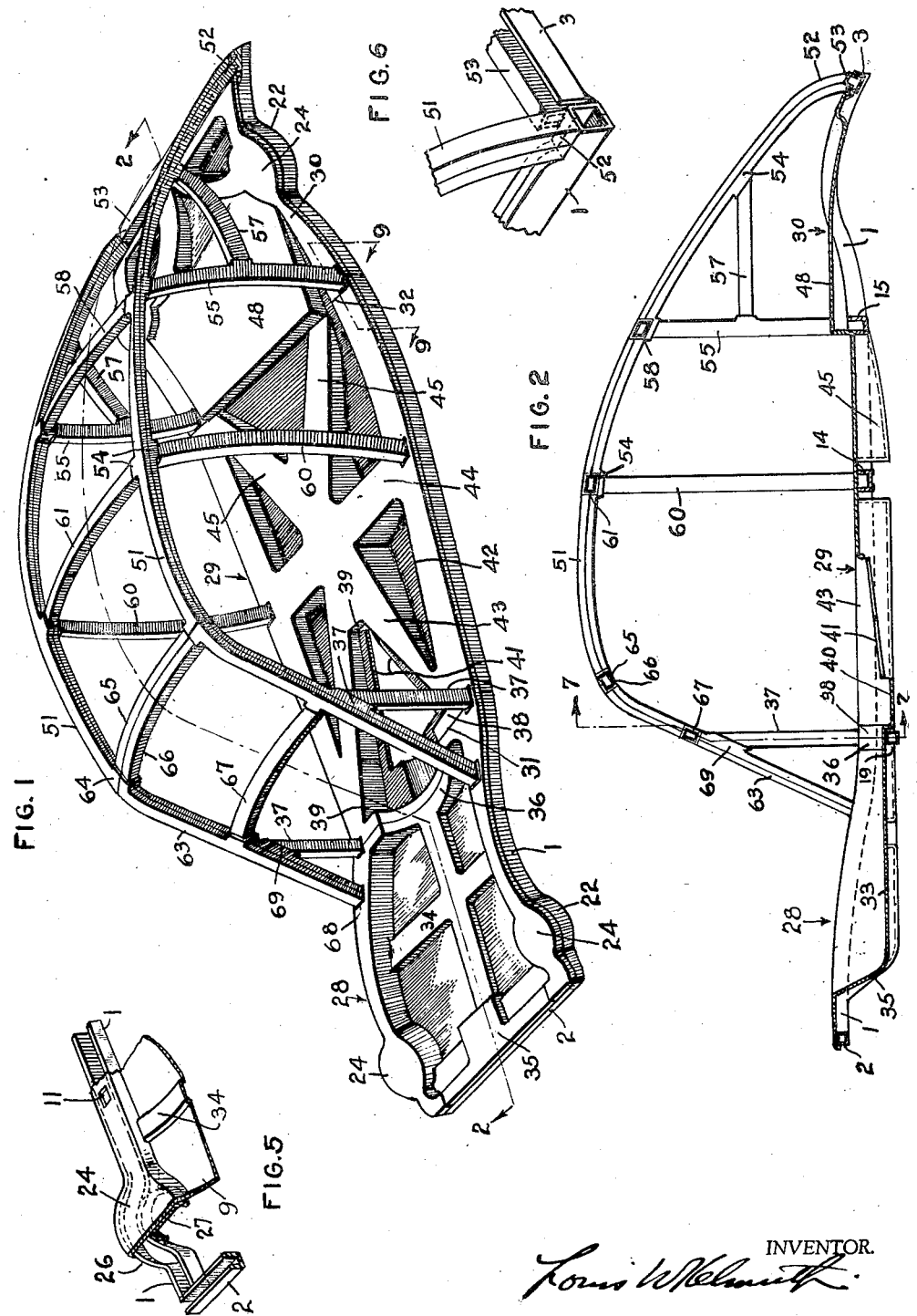
INVENTOR.
Louis W. Helmuth Nov. 27, 1945.  L. W. HELMUTH  2,389,907
VEHICLE STRUCTURE
Filed Dec. 9, 1941  3 Sheets-Sheet 2
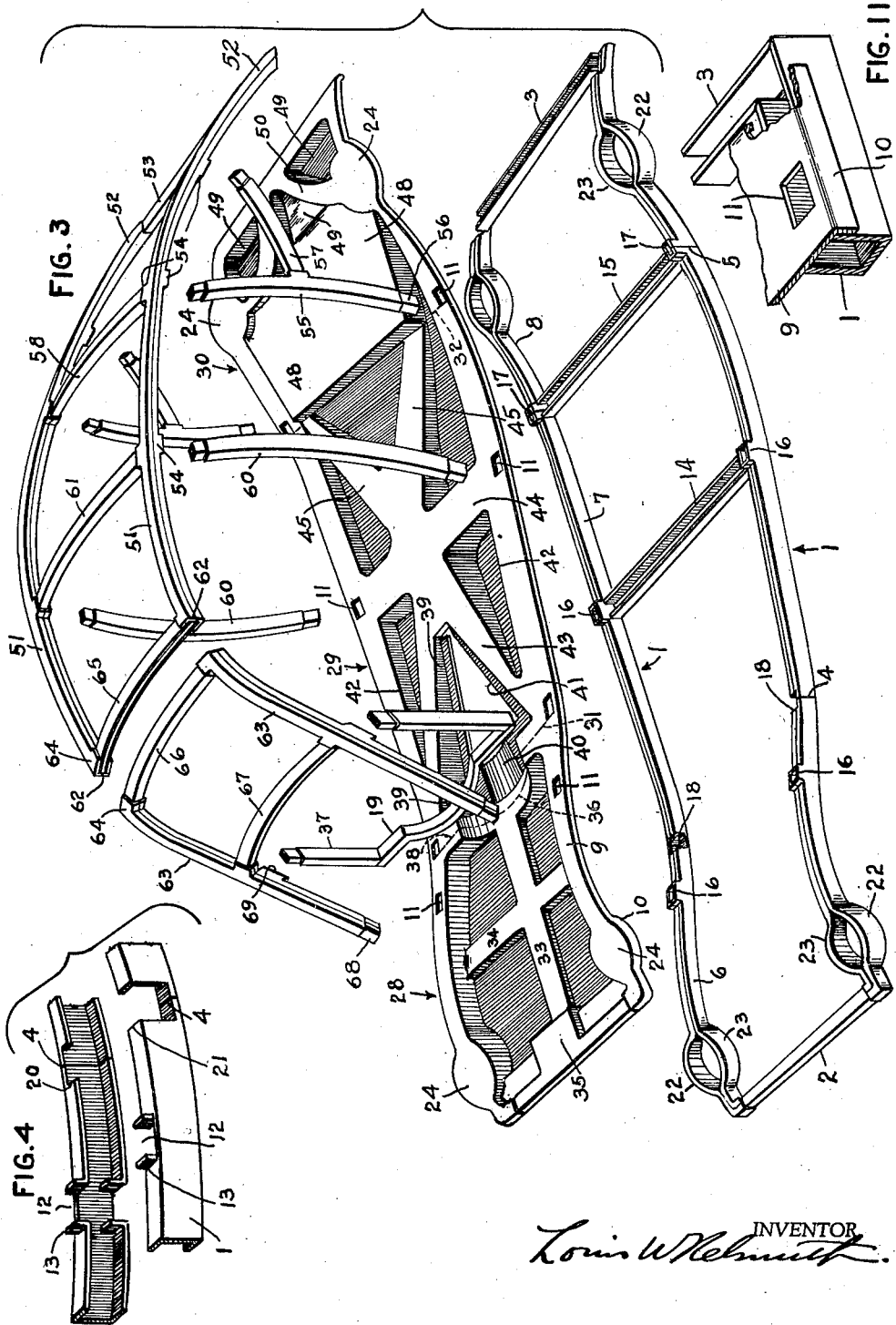
INVENTOR
Louis W. Helmuth Nov. 27, 1945.  L. W. HELMUTH  2,389,907
VEHICLE STRUCTURE
Filed Dec. 9, 1941   3 Sheets-Sheet 3
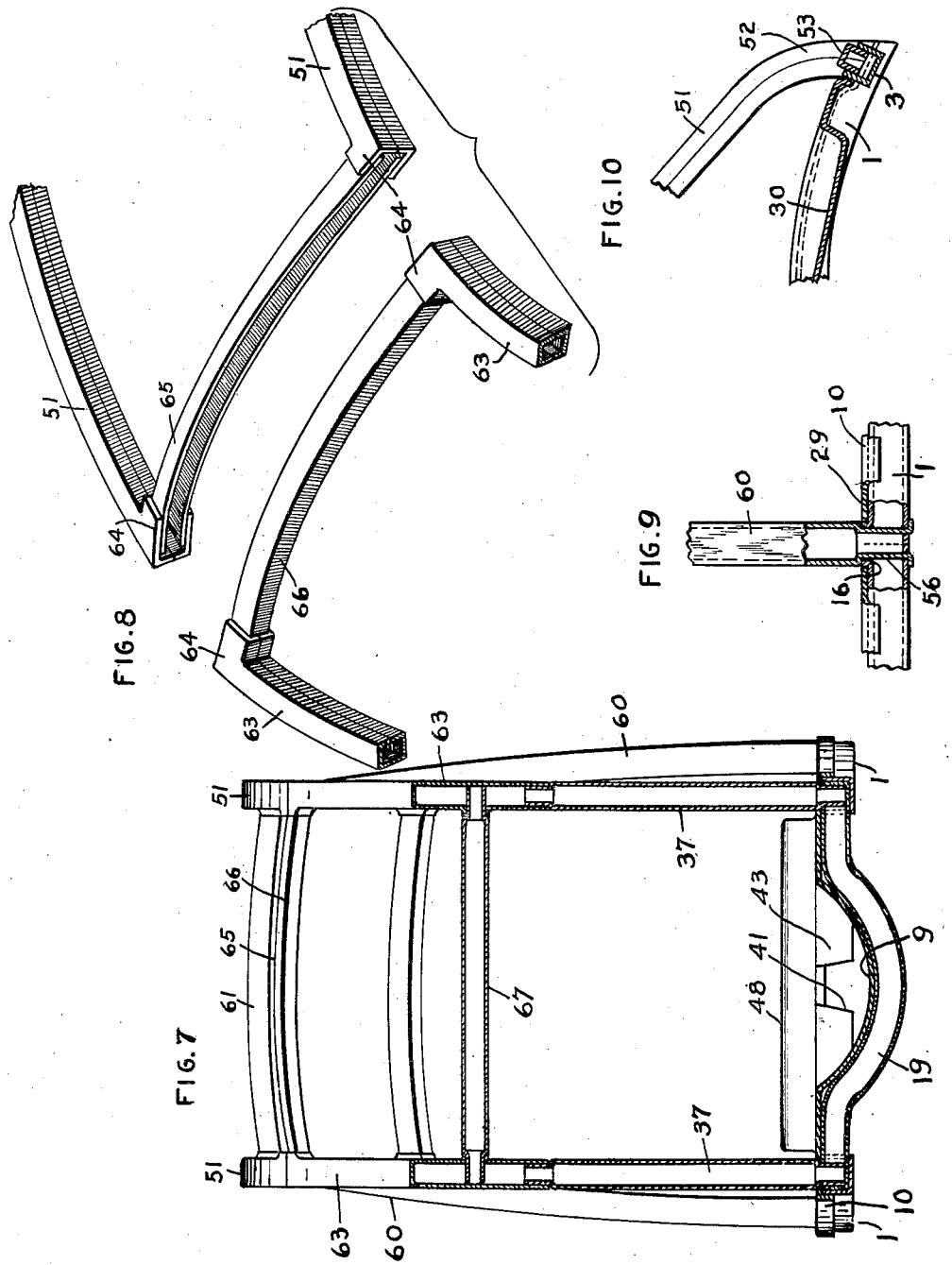
INVENTOR.
Louis W. Helmuth Patented Nov. 27, 1945

2,389,907

UNITED STATES PATENT OFFICE 2,389,907

VEHICLE STRUCTURE

Louis W. Helmuth, Lakewood, Ohio, assignor to The Midland Steel Products Company, Cleveland, Ohio, a corporation of Ohio Application December 9, 1941, Serial No. 422,250

19 Claims. (Cl. 296—28)

This invention relates to new and useful improvements in vehicle structures and an important object of the invention is to provide means whereby a body or passenger compartment is so rigidly and intimately connected with the under-frame, as to provide a unitary passenger compartment shell and chassis of unusual strength. More particularly the compartment skeleton is composed of two main girders or arches extending lengthwise of the under-frame for the greater portion of its overall length with the ends of the girders secured in the under-frame and having transverse members arranged with respect to those of the under frame to form continuous transverse arches or loops completely encircling the passenger compartment, as well as transverse bracing for the under-frame structure, so that the two heretofore separate body and frame units, become united into one unit to form a sufficiently strong foundation for a body made, even of plastics.

Another object of the invention is to provide a comparatively light weight under-frame constructed in either one or several individual sections, with or without intermediate cross members, with an intermediate floor pan disposed between the body and under-frame units, which is formed with integral pressed out ribs to provide transverse members for both the body and under-frame units, subsequently joined to form an integrated chassis shell.

Another object of the invention is to construct the under-frame floor pan and body skeleton in sectionalized units to facilitate handling and production.

A further object of the invention is to provide a chassis structure in which the various units can be sprung into final assembled positions and secured therein to place the entire structure under tension.

Another object of the invention is to provide a floor pan for the chassis made in sections of different gauge, which when secured together, extend the entire length of the chassis, with the end sections made of heavier gauge and cooperating with the longitudinals of the under-frame to provide wells for the coiled springs of independent wheel springing.

Other objects and advantages of the invention will become apparent during the course of the following description.

In the accompanying drawings forming a part of the description and wherein like numerals are employed to designate like parts throughout the several views:

Fig. 1 is a perspective view of the assembled units of the vehicle structure.

Fig. 2 is a longitudinal sectional view of the same taken on the line 2—2 of Fig. 1, Fig. 3 is an exploded view of the various units of the structure, Fig. 4 is an enlarged perspective exploded view of a portion of one of the side rails of the under-frame, Fig. 5 is a perspective view of the forward corner of a modified under-frame with parts thereof broken away for the sake of clearness, Fig. 6 is an enlarged fragmentary view of a rear corner of one form of under-frame looking from the rear end thereof, Fig. 7 is a transverse section of the vehicle structure taken on the line 7—7 of Fig. 2, Fig. 8 is an enlarged perspective view of the ends of the two roof and windshield units prior to assembly, Fig. 9 is an enlarged vertical section taken on the line 9—9 of Fig. 1, showing the joint between one of the uprights and the under-frame structure, Fig. 10 is an enlarged section through the rear end of the structure taken lengthwise thereof, Fig. 11 is an enlarged perspective of a modified form of rear corner construction for the under-frame.

Referring now to the drawings for further details, the under-frame is composed essentially of a pair of longitudinals or side rails 1, connected at their forward ends by an upwardly opening channel-shaped front transverse cross member 2, and at their rear ends by an upwardly opening channel-shaped rear cross member 3 to provide a substantially rectangular open frame. The side rails may each be one continuous length of stock, or each may be divided transversely at two points 4 and 5 to be subsequently welded together, the former being arranged adjacent the cowl of the vehicle, while the joint 5 is located approximately at the rear door post in advance of the rear kick-up. This divides the under-frame into three separate sections or units, a forward unit 6, an intermediate unit 7 and a rear section 8. These side rails are formed into box-shaped cross section. In one instance shown in Figs. 3 and 4, each side rail 1 is composed of a pair of channel-shaped bars arranged with their flanges extending horizontally toward each other and welded together to form a box section. In Figs. 1, 5 and 11, the side rails 1 are of channel-form with their flanges extending vertically and the channel groove opening upwardly to be subsequently closed into a hollow section by means of a floor pan 9 extending the entire length of the vehicle structure and provided along its two longitudinal edges with downwardly extending flanges 10 which overlap and are secured to the outer surfaces of the side rails. This floor pan is also provided along its two longitudinal margins with a plurality of openings 11 which are disposed above corresponding openings in the side rails of Fig. 3 for the reception and securement of the lower ends of posts of the body skeleton to be presently described. In Figs. 1 and 5, the openings 11 in the floor pan are disposed over the upwardly opening channels of the side rails for the reception and attachment of the body skeleton. The upper and lower flanges of the channels constituting the side rails in Figs. 3 and 4 are formed with openings 12 provided by slitting the flanges and turning up integral tongues 13 which are adapted to project through the openings 11 in the floor pan when it is laid upon and assembled with the latter. This floor pan may be employed somewhat as a jig or fixture for assembling and welding the three sections or units 6, 7, and 8 of the frame, since the tongues 13 project through the openings 11 in the pan and thereby align and hold the three frame sections together while they are welded along the division lines 4 and 5. The front and rear cross members 2 and 3 of the frame serve in holding the two side rail sections of the units 6, and 8 in assembled relationship, and an upwardly opening channel-shaped transverse cross member 14 may be employed in retaining the sections of the side rails of intermediate unit 7 in proper spaced relationship as a unit to be subsequently joined to the two end units.

Another transverse cross member 15 of upwardly opening channel shape may be secured to the end of either unit 7 or 8 to span the joint 5 and to be subsequently welded to the adjacent unit when the sections of the under-frame are assembled. As the channels of these transverse members 14 and 15 open upwardly, they are subsequently closed and formed into hollow transverse members when the floor pan is super-imposed upon and welded thereto.

In place of the spaced tongues 13, each half channel section constituting the rail of each unit may be formed with an integral upstanding half rectangular boss 16 which forms an upstanding integral rectangular socket or boss for the side rails when the two channel sections thereof are united and are adapted to extend through the respective openings 11 of the floor pan. Similar rectangular sockets 17 are conjointly formed at the ends of the intermediate and rear units 7 and 8 of the sub-frame and are united into rectangular sockets by the weld 5 joining the units 7 and 8.

The adjoining ends of the front and intermediate units 6 and 7 of the under-frame at the joints 4 are provided with a different type of opening 18 for the attachment of a hollow transverse cross member 19. As best seen in Fig. 4, the upper flanges of the outer channel rail are notched as at 20 while the upper flanges of the inner channel rail are correspondingly notched as at 21 and down through the web portion so that the ends of the transverse member 19 can be seated therein on the lower flanges of the two channel rails and can be welded therein during assembly of the structure.

In order that coil springs may be associated with the improved frame structure portions of the outer channel members of the rail sections of end units 6 and 8 are curved laterally outward as at 22, while the inner channel elements of these rails are curved inwardly in the opposite direction as at 23 to provide substantially circular vertical pockets in the end units into which the springs of independently sprung wheels may enter to abut with substantially round horizontal portions 24 of the floor pan 9 when it is superimposed upon the under-frame. In Fig. 5 wherein each side rail is composed of an upwardly opening channel section, the portion of the rail located about the coil spring is curved laterally outwardly in semicircular form as at 26 so that when the circular raised portion of the pan is welded to the rail, it closes the channel of the rail and at the same time completes a substantially circular cavity or recess for engagement with the upper end of the coil spring. In order to reinforce and increase the thickness of the circular portions of the floor pan at these points, cylindrical cup-shaped stampings 27 are suitably secured to the under side of the pan and have their depending flanges spot welded to the flanges of the side rails and to the depressed rim portions of the pan. The front and rear cross members 2 and 3 are welded to the ends of the side rails as shown in Figs. 5, 6 and 11 and form the under-frame into a fairly rigid structure, even without the auxiliary transverse cross members 14, 15 and 19.

In order to add rigidity to the under-frame, the floor pan 9 is provided to extend the full length of the frame or any portion thereof. It may be made from a one-piece stamping or divided into three separate unit stampings, 28, 29 and 30 separated along the dotted lines 31 and 32 to facilitate production and handling, or in order that any one or more of the pan units may be eliminated from the structure, where the design of the car is such as to render their use unnecessary. For example, the forward section 28 of the pan can be entirely eliminated, or the bottom of this section may be removed leaving only the portions covering the under-frame parts to form them into closed section and to provide the abutment pieces for the independent springs.

This forward section 28 of the pan comprises a one-piece stamping having an outline and shape conforming to the shape of the forward section 6 of the under-frame. It may be made of heavier gauge than the other sections and has a deep depressed central portion to cradle the internal combustion engine and the bottom of this depression is provided with a longitudinally extending central raised rib 33 intersected at its medial portion with a raised transverse rib 34 having its ends merging into the side walls of the inverted channel-shaped side margins of the stamping which cover and are securely welded to the under-frame unit 6. Motor supports may be supported from the portions of the pan overlapping the side rails 1. The sides of the pan section 28 at their forward ends are connected by an integral transverse stepped and inclined portion 35 which connects the circular portions 24 and forms, in effect, a rigid front cross member as well as a radiator support. The rear end of this forward section 28 is provided with a transversely extending raised integral rib or wall 36 which has its central portion concaved downwardly to merge into the longitudinal rib 33. This transverse rib 36 is located approximately under the dashboard of the vehicle and is adapted to rest on the cross member 19 of the under-frame as best shown in Fig. 2. The ends of this cross member are provided with vertical hollow posts 37 welded or formed integrally therewith and are adapted to project through the openings 11 in the floor pan after the ends of the cross member have been seated in the openings 18 of the under-frame with the verticals 37 projecting upwardly thereof.

The intermediate section 29 of the pan is also formed as a one-piece stamping with its forward end provided with a raised rib 38 corresponding to the rib 36 to be welded thereto along the line 31 to form conjointly therewith an inverted channel section reinforcement which is supported upon the cross member 19 in final assembly. Immediately behind this rib 38, the intermediate section 29 is provided with a forwardly deepening substantially triangular shaped depression 39, the bottom of which is provided with an arcuate depressed central portion 40 to provide clearance and a support for the transmission mechanism, and immediately behind this, the bottom of the triangular depression is provided with a cutout portion or opening 41 through which the propeller shaft of the vehicle extends rearwardly beneath the pan. Rearwardly and to the sides of this triangular depression 39, the section 29 is provided wtih a pair of triangular depressions 42 which increase in depth from the sides of the section 29 and forward ends of the depressions down to the deeper sections adjacent the center of the stamping to provide it with a pair of forwardly diverging integral inverted channel section ribs 43, the upper surfaces of which are coplanar with the sides of the stamping. Three corresponding triangular depressions are formed in the rear portion of the section 29 and are arranged symmetrically to those in the forward portion so as to provide this intermediate stamping with an inverted U-shaped transverse rib 44 and a pair of rearwardly diverging integral ribs 45, which, with the diverging ribs 43, form a substantially X-shaped embossed rib formation, adding great strength to the pan structure. All of these ribs increase in depth toward the center of the stamping as clearly illustrated. At opposite ends of the central transverse rib 44, and at the ends of the X-member arms, the stamping is provided with openings 11 adjacent its margin for the reception of uprights forming part of the skeleton body.

The rear section 30 of the pan also comprises a one-piece stamping flashwelded along the line 32 to the intermediate section 29. The forward edge of this rear section at opposite sides is notched to provide the openings 11 embracing the bosses 17 of the under-frame. This rear stamping is curved to follow the curve of the rear kickup of the under-frame and is provided over the greater portion of its area with a raised substantially horizontal rear seat platform 48. The rear portion of the stamping 30 is provided with three triangular depressions 49 nested transversely across the width of the frame to provide a pair of raised ribs 50 which diverge forwardly from the rear margin of the stamping to approximately the peripheries of the circular independent spring covers 24 to reinforce the structure in these localities.

Superimposed upon and rigidly secured to the floor pan and under-frame is a skeleton body and roof structure composed essentially of a pair of longitudinally extending roof arches 51 and a plurality of uprights. These two roof arches 51 extend lengthwise of the structure from about the cowl portion all the way to the rear end of the structure and the ends of each arch are securely and rigidly fastened in the floor pan and under-frame structure where they pass through.

As best seen in Figs. 3 and 6, the rear end 52 of each roof arch 51 is seated upon and welded to the top surface of the rear end of the side rail and a transverse inverted channel shaped bar 53 connects these two ends and nests within the upwardly facing channel of the rear cross member 3 to be welded securely along their overlapping flanges. In the event the side rails take the form of open channels as shown in Fig. 5, the rear ends 52 of the roof arches are seated within the channels of the rails and are welded to the side flanges and bottom thereof or may project through the bottom as in Fig. 9. These longitudinal arched bars 51 are preferably composed of two opposed channels having their flanges welded together to form the arches into box-shaped cross section, and the lower and inner faces of these arches are equipped with rectangular shaped bosses or flanged sockets 54 for a purpose which will presently appear. A hollow outwardly bowed upright 55 has opposite ends 56 reduced in cross section so that the lower end will pass through the rearmost opening 11 in the floor pan and down thru the hollow side rail to be welded thereto and all around its periphery to the floor pan. Similarly, the upper end of this upright fits in a rectangular boss or socket 54 of the roof arch and is securely welded thereto all around its periphery. In order to provide a rear quarter window, a horizontal hollow bar 57 with reduced ends is welded in appropriately located sockets 54 of the roof arch and the upright 55. A hollow bow 58 of rectangular hollow cross section has opposite ends reduced and connected with sockets 54 in the two roof arches 51 practically in line with the upright 55. A pair of outwardly bowed intermediate door posts 60 are provided for opposite sides of the body skeleton and their opposite ends, like the uprights 55 are reduced in cross section to fit and be secured in the openings 11 of the pan and the sockets 54 of the roof arches. A second hollow roof bow 61 similar to 58 is secured in the rectangular sockets 54 just opposite the door posts. When assembling this structure, the rear ends 52 of the arches, the lower ends of the uprights 55 and door posts 60 may be welded in the pan and under-frame, to be subsequently sprung into and welded in the sockets 54 of the roof arches to place the structure under stress. These two roof arches 51 are divided transversely as at 62 over the windshield portion to facilitate assembly and handling of the roof and cowl frames in separate pieces. The forward ends of the arched members 51 which form the cowl and windshield uprights are designated by the numeral 63. At the point of division 62, the ends of the members 51 and 63 are provided with complementary half sockets 64 to receive channel-shaped roof bows 65 and 66 which are welded together along their longitudinal edges when the frame is assembled. In some instances the members 51 and 63 may not be divided at 62, but may be one continuous arched member extending from the cowl portion of the vehicle all of the way back to the rear thereof. The two half sockets 64 of the arched roof members 51 are also welded together simultaneously with the welding of the bows 65 and 66 so that the arched members 51 become integrated arches extending continuously from the cowl portion all the way back to the rear end of the chassis. The two extensions 63 are also connected by a transverse hollow member 67 arranged approximately along the lower edge of the windshield opening. The lower ends 68 of the arched member 63 are reduced to pass through the openings 11 in the floor pan and into the forwardmost socket 16 of the under-frame to be welded securely to both these members. If desired, the member 63, may be welded to the roof arches 51 so that after the rear ends 52 have been welded to the underframe, their forward ends 68 may be sprung rearwardly and inserted into the openings 11 and sockets 16 to place the roof structure under compressive stress. With the upstanding arms 37 of the cross member 19 in position, their upper reduced ends may be simultaneously guided into sockets 69 of the member 63 while the ends 68 are being properly associated with their respective sockets. The upper ends of the uprights 37 are then welded in the sockets 68 to provide an extremely rigid vehicle structure.

Thus, it will be apparent that the roof structure provides an arch or turtle back structure and body contour, the chord of which is formed by the pan or under-frame or both when used together. Quite a strong structure is provided when the floor pan is entirely eliminated, since the under-frame alone then constitutes the chord which may be transversely strengthened by the use of the three cross members 14, 15 and 19 or simply by the use of an intermediate pan unit 29. The roof bows 58 and 61 are located opposite the cross members 14 and 15 and together with the uprights 55 and 60 form endless loops arranged transversely of the structure. Likewise, a similar loop is formed by the members 19, 57 and 67. The roof and body arches 51 extend almost the full length of the chassis and lend great strength to the under-frame from the standpoint of static and torsional load, inasmuch as they are rigidly joined at intervals by the upright and door posts. When the floor pan is used however, it is found that the gauge of the body and under-frame unit can be lightened considerably.

It will be understood that various changes in the size, shape and arrangement of parts may be resorted to without departing from the spirit of the invention.

I claim:

1. A vehicle chassis structure comprising a substantially rectangular frame, a pair of arched longitudinals secured at their rear ends to said frame and curving upwardly and horizontally to form a roof structure, said arched members having their forward ends curved downwardly and forwardly of the frame to form a windshield and cowl framing with the lower ends of the arched members rigidly secured to said frame, and a transverse cross member for said rectangular frame having perpendicular ends secured to the inclined forward ends of said arched members and spaced rearwardly of said lower ends of said arched roof members.

2. A vehicle chassis structure comprising a substantially rectangular frame including side rails having portions bowed laterally to provide spring wells, and a floor pan unit connecting the rails, and having portions overlapping the laterally bowed portions of the rails to provide spring seats.

3. A vehicle chassis structure comprising a substantially rectangular frame including side rails having portions bowed laterally to provide spring wells, and a floor pan unit connecting the rails and having portions overlapping the laterally bowed portions of the rails to provide spring seats, and said pan having a rib structure connecting the overlapping portions of the pan.

4. A vehicle chassis structure including a pair of side rails having sockets therein with marginal flanges, a floor pan superimposed upon the rails and having openings receiving the socket flanges of the rails, and a body structure having verticals with their lower ends received in said sockets and secured thereto and to the edges of said openings.

5. A vehicle structure comprising a pair of side rails with sockets therein, a cross member resting in said sockets and secured thereto, a floor pan connecting said rails and having a pair of openings aligned with said sockets, said cross member having upstanding ends extending vertically through said openings to points above the pan and forming parts of a body structure, and a body structure superimposed upon said pan and secured to the upstanding ends of said cross member.

6. A vehicle structure comprising a pair of side rails with sockets therein, a cross member resting in said sockets and secured thereto, a floor pan connecting said rails and having a pair of openings aligned with said sockets, said cross member having upstanding ends extending vertically through said openings to points above the pan and forming parts of a body structure including a pair of arched members extending longitudinally of the frame and having their ends extending through the floor pan and secured thereto and to said side rails.

7. A vehicle structure comprising a pair of side rails with seats therein, a horizontal cross member resting in said seats, and secured thereto, said cross member having integral vertical ends extending substantially vertical out of said seats in the rails, and a body structure superimposed upon said rails and secured to the vertical ends of said cross member.

8. A vehicle structure comprising a pair of side rails with seats therein, a horizontal cross member resting in said seats, and secured thereto, said cross member having ends of the same cross section as the horizontal portion and bent to extend substantially vertically out of said seats in the rails, and a body structure including a pair of arched members extending lengthwise of the rails and secured thereto and to the upper vertical ends of said cross member.

9. A vehicle body structure comprising a base frame, and a body frame including a pair of arched longitudinals arched lengthwise over the base frame and having both ends inclined downwardly and flexed to be secured directly to the ends of said base frame under stress from said flexure, and each of said longitudinals comprising a channel member with its channel opening upwardly and bowed or convexed upwardly to form the roof contour, and means secured to said longitudinals to close the open channels thereof and to form them into closed box section throughout their length.

10. A vehicle body structure comprising a base frame having side rails with connecting transverse members, and a body frame including a pair of arched longitudinals arched lengthwise over the base frame and having both ends inclined downwardly and secured directly to the ends of said side rails while flexed into a stressed condition, and each of said longitudinals comprising a channel member with its channel opening upwardly and bowed or convexed upwardly to form the roof contour, transverse roof members connecting said longitudinals, and box cross section uprights secured to the side rails and being secured under said stress to the longitudinals at the ends of transverse members connecting the longitudinals.

11. A vehicle structure comprising the combination with an intermediate floor pan having ribs embossed therein and arranged to intersect at the center of the pan and to radiate to the corners thereof, a transverse rib extending through the intersection of the first named ribs; of corner and door posts rigidly secured to the pan at points adjacent the ends of said ribs.

12. A vehicle structure comprising a base frame including a pair of box section longitudinal rails having flanged openings, a floor pan coextensive with the rails and secured thereto, said pan having openings receiving the flanges of said openings, and said pan further having ribs embossed thereon and terminating adjacent said openings at opposite sides of the pan.

13. A vehicle chassis comprising a floor pan having openings along its opposite edges, and an underframe composed of a plurality of units adapted to be assembled end to end and having parts adapted to project through said openings in the pan whereby the latter serves as a jig to facilitate assembly of the underframe units into a unitary structure.

14. A vehicle chassis comprising a floor pan having openings along its opposite edges, and a skeleton roof and body structure composed of a plurality of separate arched longitudinal and transverse units adapted to be assembled into a unitary roof and body structure to add to the torsional resistance of the pan, said roof and body structure having parts projecting through said openings in the pan whereby the latter serves as a jig to facilitate assembly and fastening of said parts of said roof and body structure in unitary relationship.

15. A vehicle chassis comprising side sills of upwardly opening channels, a floor pan spanning the space between said sills and closing said upwardly opening channels into box section and having openings in alignment with said channels, and a body structure with parts adapted to project through said openings in the pan whereby the latter serves as a jig to facilitate assembly of the structure.

16. A vehicle chassis comprising a pair of side rails, means connecting the rails in fixed spaced relationship, a body skeleton frame composed of arched roof longitudinals spaced from said side rails and flexed transversely of their length and sprung into final position on said rails and secured to said rails under stress, and upright door posts flexed transversely of their length to place the same under stress and secured between said rails and roof longitudinals under such stressed condition.

17. A vehicle chassis including a base frame, a body skeleton frame composed of arched roof longitudinals spaced from said frame and flexed transversely of their length and sprung into final position on said base frame and secured under stress to said base frame, and upright door posts flexed transversely of their length to place the same under stress and secured between said base frame and longitudinals under such stressed condition.

18. A vehicle chassis comprising a base frame, a body skeleton frame composed of arched roof members spaced from said base frame and flexed transversely of their length and sprung into final position on said base frame and secured under stress to said base frame at their ends.

19. A vehicle chassis comprising a base frame, a body skeleton frame composed of arched roof longitudinals spaced from said base frame and fixed thereto at their ends, and upright door posts extending between the base frame and longitudinals and flexed transversely of their length to place the same under stress, said uprights being secured between said base frame and longitudinals under such stressed condition.

LOUIS W. HELMUTH.